UNITED STATES PATENT OFFICE.

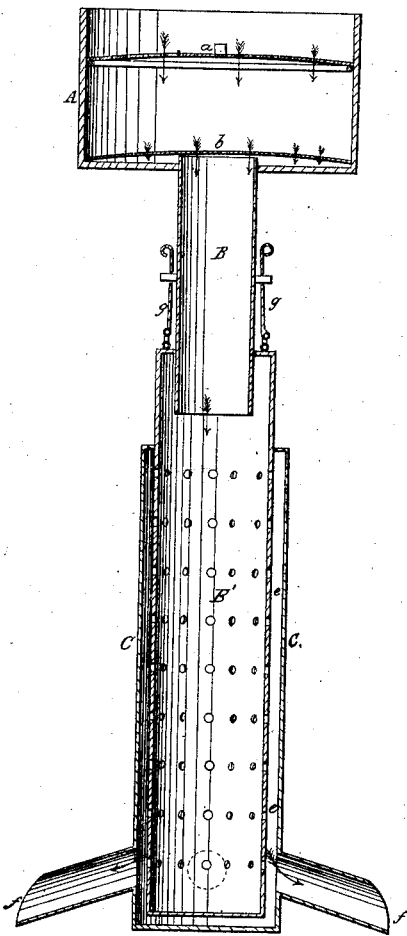
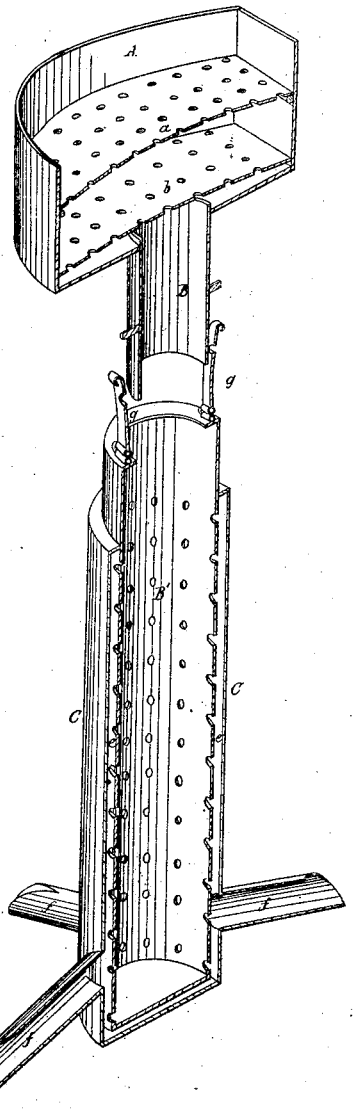
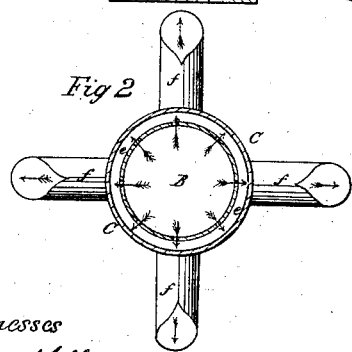

BENJAMIN BEST, OF DAYTON, OHIO.

IMPROVEMENT IN FILTERS.

Specification forming part of Letters Patent No. 41,357, dated January 26, 1864.

*To all whom it may concern:*

Be it known that I, BENJAMIN BEST, of Dayton, county of Montgomery, State of Ohio, have invented a new and Improved Filtering Apparatus; and I do hereby declare that the following is a full, clear, and exact decription thereof, reference being had to the accompanying drawings, making a part of this specification, in which—

Figure 1 is a vertical diametrical section through my improved apparatus. Fig. 2 is a horizontal section taken through the lower filtering-vessel. Fig. 3 is an isometrical section showing the upper and lower portions detached.

Similar letters of reference indicate corresponding parts in the three figures.

The object of this invention is to construct a filter in such manner that the water shall first pass through filtering materials arranged outside of the receiving-cistern in such a locality that ready access can be had to them for cleaning and renewal, after which the water, which has been deprived of a greater portion of its filth, shall pass through a second filtering medium arranged within the cistern, all as will be hereinafter described.

The objection attending the filtration of water for domestic purposes, where it is desired to purify the water running into cisterns, is that the filtering material, which soon becomes impaired, cannot be readily cleaned or removed without removing the water from the cistern. This objection I remove by constructing that portion of the filtering apparatus through which the water first percolates, and which necessarily receives all the solid impurities in the water, so that it can be readily detached and removed from that portion of the filter which is arranged in the cistern, thus enabling me to keep the filtering apparatus in order without removing the water from the cistern.

To enable others skilled in the art to make and use my invention, I will proceed to describe its construction and operation.

The box A may be constructed of brick, stone, slate, or of wood, lined with cement so as to make its joints water-tight. This box is provided with two removable perforated division-plates, $a\ b$, which form two compartments for receiving the filtering materials used in this box. The lower compartment is intended to contain charcoal or other suitable filtering substance, and the upper compartment is to contain gravel, which two substances are separated by the perforated partition $a$. (Shown in Figs. 1 and 2.)

To the bottom of the filtering-box A, beneath the perforated plate $b$, I attach a pipe, B, which may be made of any desirable length, according to the distance of the box A from the cistern, which receives and contains the filtered water. The pipe B forms a communication between the box A and a filter, which is arranged within the cistern, for further purifying the water escaping from the first filtering substances. This filter consists of a perforated cylinder, B', inclosed by a casing, C, which forms a space, $e$, surrounding the interior cylinder. The space $e$ is closed at top and opened at or near its bottom by four or more or less outlet-pipes, $f\ f$, which latter allow the filtered water to escape into the cistern. The chamber within the perforated cylinder B' is filled with charcoal or other suitable filtering material, and as the water filters through this material it escapes into the space $e$, through the perforated lining or wall, and passes out through the pipes $f\ f$. This latter portion of the filtering apparatus is arranged within the receiving-cistern in any suitable manner, either by mounting it upon bricks placed therein or suspending it above the bottom of the cistern; and the pipe B, leading from the box A, is attached to the upper end of the cylinder B' by means of the hinged fastenings $g\ g$, which allow the pipe B, together with its box A, to be removed for cleaning and renewing the contents of the latter. The upper filtering-box, A, which receives nearly all the sediment and other impurities, is arranged on the outside of the cistern, and is convenient of access, so that it can be cleaned out and repacked at pleasure. This upper filtering-box can be built in the house or located at any convenient place about the top of the cistern, and the conducting-pipe B at the bottom carried by an elbow, if necessary, into the cistern, and thus attached to the filter therein, which, as before explained, may be suspended at any convenient depth and fastened by the hinged ears $g\ g$ to the conducting-pipe B.

It will be seen from the above description that I retain nearly all the sediment or insoluble matter in that portion of the apparatus which is arranged outside of the cistern, and thus while I am enabled to get at the contents of the filtering-box A, for renewing them, I also keep the filthy sediment free from the water contained in the cistern, and thus prevent this water from becoming tainted. The refiltering of the water after it escapes from the box A serves to further purify this water, and as thi slatter filter receives the water nearly pure, it will not become impaired for a considerable length of time, especially if the upper filter is cleansed as often as it becomes foul, for which operation I have especially provided in my improved apparatus.

Having thus described my invention, what I claim as new, and desire to secure by Letters Patent, is—

1. The construction of the box A with removable perforated partitions $a\,b$, in combination with the perforated cylinder B', space $e$, and jacket or casing C, substantially as and for the purposes described.

2. The combination of an upper horizontal detachable filter, A, with a lower permanent vertical filtering-chamber, B', substantially as and for the purpose set forth.

3. The combination of the horizontal filtering-box A with the upright filtering-chamber B', passage $e$, and outlets $f\,f$, arranged and operating substantially as described.

BENJAMIN BEST.

Witnesses:
D. A. HOUK,
H. ELLIOTT.